United States Patent
Bellettini et al.

(10) Patent No.: US 11,010,577 B1
(45) Date of Patent: May 18, 2021

(54) MOBILE COMPUTER WITH MODULAR / COMPANION SCAN ENGINE UNIT

(71) Applicant: Datalogic IP Tech S.R.L., Calderara di Reno (IT)

(72) Inventors: Carlo Bellettini, Ferrara (IT); Piero F. P. Regard, S. Lazzaro di Savena (IT); Davide Bottazzi, Bologna (IT)

(73) Assignee: Datalogic IP Tech S.R.L., Calderara di Reno (IT)

( * ) Notice: Subject to any disclaimer, the term of this patent is extended or adjusted under 35 U.S.C. 154(b) by 0 days.

(21) Appl. No.: 16/688,023

(22) Filed: Nov. 19, 2019

(51) Int. Cl.
  *G06K 7/10* (2006.01)
  *G06K 7/14* (2006.01)
  *G06F 13/20* (2006.01)

(52) U.S. Cl.
  CPC .......... *G06K 7/1417* (2013.01); *G06F 13/20* (2013.01); *G06K 7/10564* (2013.01); *G06K 7/1413* (2013.01); *G06F 2213/40* (2013.01)

(58) Field of Classification Search
  CPC .......... G06K 7/10881; G06K 7/10861; G06K 7/10722; G06K 7/1417; G06K 7/10564; G06K 7/1413; G06F 13/20
  USPC .................................... 235/462.45
  See application file for complete search history.

(56) References Cited

U.S. PATENT DOCUMENTS

| | | | | |
|---|---|---|---|---|
| 6,182,898 B1* | 2/2001 | Schmidt | ................. | G02B 26/10 235/462.45 |
| 6,189,788 B1* | 2/2001 | Sherman | .............. | G07G 1/0081 235/383 |
| 7,044,377 B2 | 5/2006 | Patel et al. | | |
| 7,546,953 B1* | 6/2009 | Collins, Jr. | ........ | G06K 7/10594 235/462.14 |
| 2003/0006998 A1* | 1/2003 | Kumar | .................. | G06F 3/0202 715/700 |
| 2016/0042241 A1* | 2/2016 | Todeschini | ............. | G06K 9/228 345/179 |

OTHER PUBLICATIONS

Product Spec Sheet; Zebra CS4070 Scanner, (https://www.zebra.com/content/dam/zebra_new_ia/en-us/solutions-verticals/product/barcode-scanners/Companion/Symbol%20CS4070%20Companion%20Scanner/spec-sheet/cs4070-specification-sheet-A4.pdf), Jan. 2017, 2 pages.

(Continued)

*Primary Examiner* — Ahshik Kim
(74) *Attorney, Agent, or Firm* — Foley & Lardner LLP

(57) ABSTRACT

A system and method of scanning a machine-readable indicia may include, in response to determining that the scan engine module is in an engaged state and electrically connected to a computer, communicating the decoded data to the computer via a wired communications channel. Otherwise, in response to determining that the scan engine module is in a released state and wirelessly connected to the computer, communicate the decoded data to the computer via a wireless communications channel. The scan engine module may be configured to operate autonomously from the mobile computer to be able to scan machine-readable indicia, decode the machine-readable indicia to generate decoded data, and store the decoded data. In response to the machine-readable indicia being electrically connected to the mobile computer, the machine-readable indicia may be batched uploaded to the mobile computer.

20 Claims, 10 Drawing Sheets

(56) References Cited

OTHER PUBLICATIONS

Symbol CS4070 Companion Scanner | Zebra, (https://www.zebra.com/us/en/products/scanners/companion-scanners/cs4070.html), printed Sep. 19, 2019, 6 pages.
Panasonic TOUGHBOOK L1—Computer Product Solutions | Panasonic Business (https://business.panasonic.co.uk/computer-product/TOUGHBOOK-L1), printed Sep. 19, 2019, 3 pages.
Socket Mobile | POS Scanners | Attachable Barcode Scanner | Shopify scanner (https://www.socketmobile.com/products/800-series/socketscan/overview-vend-barcode-scanner), printed Sep. 19, 2019, 3 pages.

* cited by examiner

MOBILE COMPUTER WITH MODULAR / COMPANION SCAN ENGINE UNIT

BACKGROUND

Mobile computers are often used for assisting workers with scanning machine-readable indicia (e.g., barcodes, QR codes, etc.) in performing a variety of tasks. Such tasks often involve reading machine-readable indicia for taking inventory in warehouses and retail stores, reading identifiers of products (e.g., performing rental vehicle checkout at airports, checking out customers in retail environments), and other routine tasks in which the workers are to use the mobile computers to perform the scanning of the machine-readable indicia. In some environments, using a mobile computer in performing scanning can be inconvenient or even dangerous, such as when workers are on ladders to perform scanning. In some uses of mobile computers to perform scanning of machine-readable indicia, bulkiness of mobile computers can make it difficult or impractical in performing a variety of different types of scanning, such as in the case of vehicle-mounted terminals (VMTs) that use rugged, industrial tablets as the mobile computers.

To improve the ergonomics for workers, a variety of mobile computers have been developed that are handheld and configured to be in the form of a gun. The handheld mobile computers are smaller and lighter than conventional laptop or ruggedized computers. However, despite the mobile computers being more ergonomic than previous models of mobile computers, even these current versions mobile computers are still too bulky as both arm and hand fatigue result for workers who use the mobile computers. Moreover, even these more ergonomic handheld mobile computers are inconvenient when working in tight spaces, such as within shelves in warehouses or in fast-pace distribution centers.

The mobile computers typically have scan engines fixedly attached to the mobile computers. These scan engines are typically screwed into the mobile computers and limited to operating only when fixedly attached to the originally mated mobile computers. As such, the limitations of existing mobile computers used for scanning machine-readable indicia present challenges for workers in terms of ergonomics and efficiency in their tasks. Accordingly, new mobile computer systems and processes for supporting workers in scanning machine-readable indicia are needed.

BRIEF SUMMARY

To overcome the problems of conventional mobile computers used in performing reading of machine-readable indicia, a mobile computer system may include a mobile computer and a releasable scan engine module that is configured to operate autonomously relative to the mobile computer. In being autonomous, the releasable scan engine module may be configured with a hardware and software configuration that enables the module to scan, decode, and store and/or remotely communicate the decoded machine readable-indicia with the mobile computer. To simplify operations for the operator, the mobile computer and releasable scan engine module may be preconfigured to operate with one another (i.e., the devices are pre-paired) such that no initial synching or pairing is needed to be performed by a user. In being releasable, the releasable scan engine module may include a housing that is releasably engageable with a housing of the mobile computer in a manner that does not need a tool (e.g., screwdriver) to separate the releasable scan engine module from the mobile computer. In another embodiment, a holder that (i) physically and electrically connects to the mobile computer and (ii) is configured for the releasable scan engine module to be releasably engageable with the holder. In both configurations, the scan engine module is in electrical communication with the mobile computer.

The releasable scan engine module may include a rechargeable battery, a scan button or other trigger, an image or other optical sensor, a processor and memory for decoding scanned machine-readable indicia and wired and wireless communications electronics to communicate with the mobile computer. The releasable scan engine module may further include an illuminator to illuminate machine-readable indicia being scanned.

The releasable scan engine module may be configured to operate in a single scan mode or a batch scan mode. If operating in a batch scan mode, the releasable scan engine module may be used to scan multiple machine-readable indicia with or without being in wireless communication with the mobile computer. When the releasable scan engine module is releasably connected with the mobile computer either directly or via a holder, the mobile computer may cause the releasable scan engine module to upload the batched decoded data being stored by the releasable scan engine module. If in a single scan mode, when the releasable scan engine module is in wireless communication with the mobile computer, the releasable scan engine module may image a machine-readable indicia, decode the machine-readable indicia, and wirelessly communicate the decoded information of the machine-readable indicia to the mobile computer. In an embodiment, the mode may be automatically set based on whether the scan engine module is in active wireless communication with the mobile computer. A common software platform may be utilized on different mobile computer hardware platforms to enable the releasable scan engine module to be automatically identified, authenticated, and linked with different mobile computers.

A mobile computer system may include a mobile computer including a first housing, a first electrical connector disposed on the first housing, a first processor in electrical communication with the first electrical connector, and a first non-transitory memory in electrical communication with the first processor and configured to store data. The mobile computer may further include a first antenna. First input/output (I/O) electronics of the mobile computer may in electrical communication with the first processor and the first antenna, and be configured to communicate over respective communications channels via the first electrical connector and the first antenna. The mobile computer system may further include a releasable scan engine module including a second housing, a second electrical connector adapted to form an electrical connection with the first electrical connector when the removable scan engine module is in an engaged state with the mobile computer, and a second processor in electrical communication with the second electrical connector. A second non-transitory memory of the removable scan engine module may be in electrical communication with the second processor and be configured to store data. The releasable scan engine module may further include a second antenna. Second I/O electronics of the releasable scan engine module may be in communication with the second processor, and be configured to communicate data over respective communications channels via the second electrical connector and the second antenna. An optical sensor of the releasable scan engine module may be configured to capture image signals representative of the machine-readable indicia. The second processor may be configured to decode the captured image signals and to produce decoded data represented by the machine-readable indicia.

One embodiment of a method of scanning a machine-readable indicia may include, in response to determining that the scan engine module is in an engaged state and electrically connected to a computer, communicating the decoded data to the computer via a wired communications channel. Otherwise, in response to determining that the scan engine module is in a released state and wirelessly connected to the computer, communicate the decoded data to the computer via a wireless communications channel.

One embodiment of a mobile computer system may include a mobile computer, and a releasable scan engine module configured to operate autonomously from the mobile computer in scanning and decoding machine-readable indicia. The mobile computer may be configured to automatically identify the releasable scan engine module via a wired communications channel and a wireless communications channel.

BRIEF DESCRIPTION OF THE DRAWINGS

Illustrative embodiments of the present invention are described in detail below with reference to the attached drawing figures, which are incorporated by reference herein and wherein:

FIG. 10 is a flow diagram of an illustrative process of a mobile computer and releasable scan engine module to communicate with one another in accordance with the principles provided herein.

DETAILED DESCRIPTION OF THE DRAWINGS

Figure 1A:
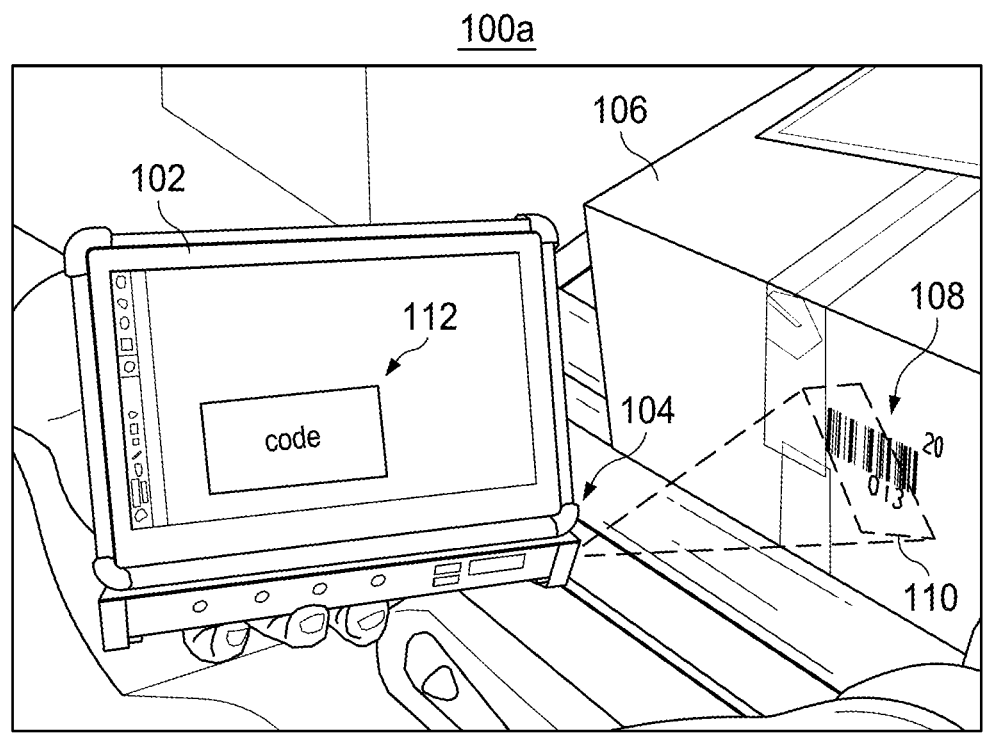
FIGS. 1A and 1B are illustrations of illustrative environments in which objects with machine-readable indicia attached thereto are being scanned by a mobile computer with a releasable scan engine module.
Figure 1B:
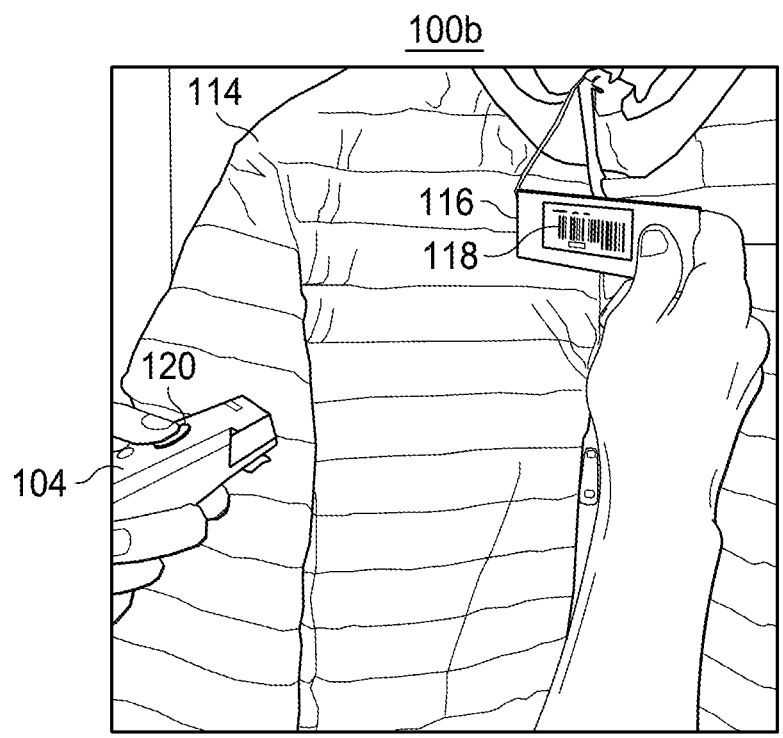

With regard to FIGS. 1A and 1B, illustrations of illustrative environments 100a and 100b in which objects with machine-readable indicia attached thereto are being scanned by a mobile computer 102 with a releasable scan engine module 104 are shown. The mobile computer 102 with the releasable scan engine module 104 being in electrical communication and currently positioned in an engaged state is shown. An object 106, which may be a parcel, letter, or any other type of object, is shown to have a machine-readable indicia 108 printed or otherwise attached (e.g., sticker) thereon. The machine-readable indicia 108 may be a barcode, QR code, or any other machine-readable symbol, as understood in the art. In operation, a scan region 110 may be created by the scan engine module 104, such as by generating an illumination signal that, in whole or in part, is displayed on the object 106 when scanning the machine-readable indicia 108. The releasable scan engine module 104 may be configured with the ability to capture images using an image sensor or to scan using a laser scanner. For the purposes of this disclosure, both imaging and scanning shall be considered scanning.

In operation, with the scan engine module 104 being either directly or indirectly physically and electrically connected to the mobile computer 102, control of the scan engine module 104 may be managed directly from the mobile computer 102. To initiate a scanning operation, a physical button on any of the mobile computer 102, scan engine module 104, or a virtual button on an electronic display of the mobile computer 102 may be activated by a user. A resulting decoded code (i.e., information or data represented by the machine-readable indicia) from the scan may be displayed on the electronic display of the mobile computer 102. Also the scan engine module 104 may have a display for use in displaying control features and/or data, such as decoded data represented by a machine-readable indicia. Other functions that use the decoded code or data may be performed by the mobile computer 102, as well.

With regard to FIG. 1B, the releasable scan engine module 104 is shown to be in a released state in which the module 104 is released from the mobile computer 102 (i.e., from the housing or holder attached to the housing) to enable the user or operator to scan machine-readable indicia of objects. In this case, the object 114 is a jacket. However, the object 114 may be any other type of object, as understood in the art. The object 114 may have a tag 116 on which a machine-readable indicia 118 is printed. To scan the machine-readable indicia 118, the operator may press a button 120 on the module 104 to cause the module 104 to initiate a scan of the machine-readable indicia 118, decode the indicia 118, and store the decoded data, and/or communicate the decoded data back to the mobile computer 102.

In operation, with the scan engine module 104 being removed from being directly or indirectly physically and electrically connected to mobile computer 102, the scanning operation may be managed from the scan engine module 104. The scanning operation may be started or triggered by an operator activating (e.g., pressing) the physical button 120 or any other scan trigger mechanism of the module 104. In an alternative embodiment, an alternative trigger action, such as a gesture (e.g., certain preset movement) with the module 104, may be performed to initiate a scan operation by the scan engine module 104.

The scan engine module 104 may be configured in one of three optional modes, including (i) a batch mode, (ii) a "live" mode, or (iii) a live mode and batch feedback mode. In the live mode, the mobile computer 102 may be configured to control the scan engine module 104 as if the mobile computer 102 and scan engine module 104 were in electrical connection with one another. In the batch mode, the mobile computer 102 may be configured to control the scan engine module 104 when the scan engine module 104 is placed in electrical connection with the mobile computer 102. Communication of the decoded data between the scan engine module 104 and the mobile computer 102 may be performed. The resulting decoded data representative of the scanned codes or machine-readable indicia may be communicated to the mobile computer 102 individually or in a batch of multiple decoded data or codes depending on the mode in which the scan engine module 104 is set. It should be understood that the releasable scan engine module 104 may be automatically set based on being in wireless communication with the mobile computer 102 or not. Alternatively, the user may override the autonomous setting of the module 104.

Figure 2:
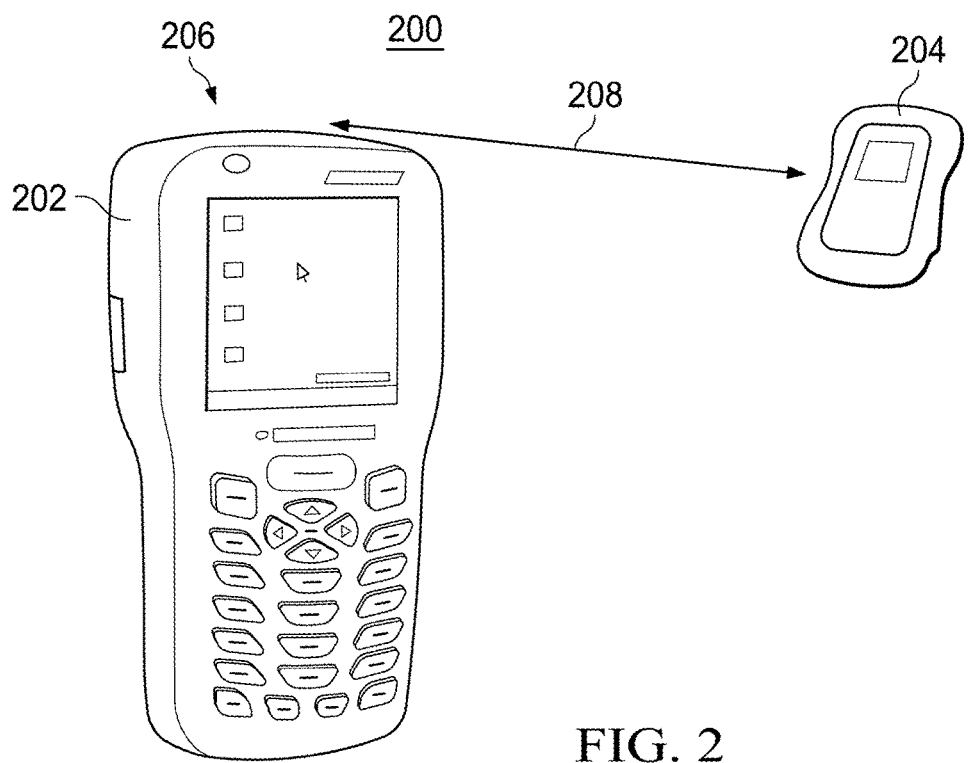
FIG. 2 is an illustration of an illustrative hand-held mobile computer with a releasable scan engine module.

With regard to FIG. 2, an illustration of a mobile computer system 200 including handheld mobile computer 202 (parent unit) with a releasable scan engine module 204 (child unit) is shown. A mobile computer unit 200 may include the mobile computer 202, in this case a handheld mobile computer, and releasable scan engine module 206. In this case, the scan engine module 206 may be directly or indirectly configured to be removably engagable with the mobile computer 202. In an embodiment, the module 206 may be configured to be inserted into a cavity or recess 206 defined by a housing of the mobile computer 202, as further described herein. In an alternative embodiment, the mobile computer 202 and releasable scan engine module 204 may be in communication with one another via a wireless communications channel 208 (e.g., Bluetooth®, WiFi®, or any other local wireless communications channel) that enables the module 206 to communicate decoded scan data to the mobile computer 202 when operating separate from and local to the mobile computer 202. That is, the module 206 may operate autonomously from the mobile computer 202 and wirelessly communicate decoded data back to the mobile computer 202 in real-time if operating in the live mode. In an embodiment, an NFC tag on the module 206 may be used for pairing identification purposes.

Figure 3:
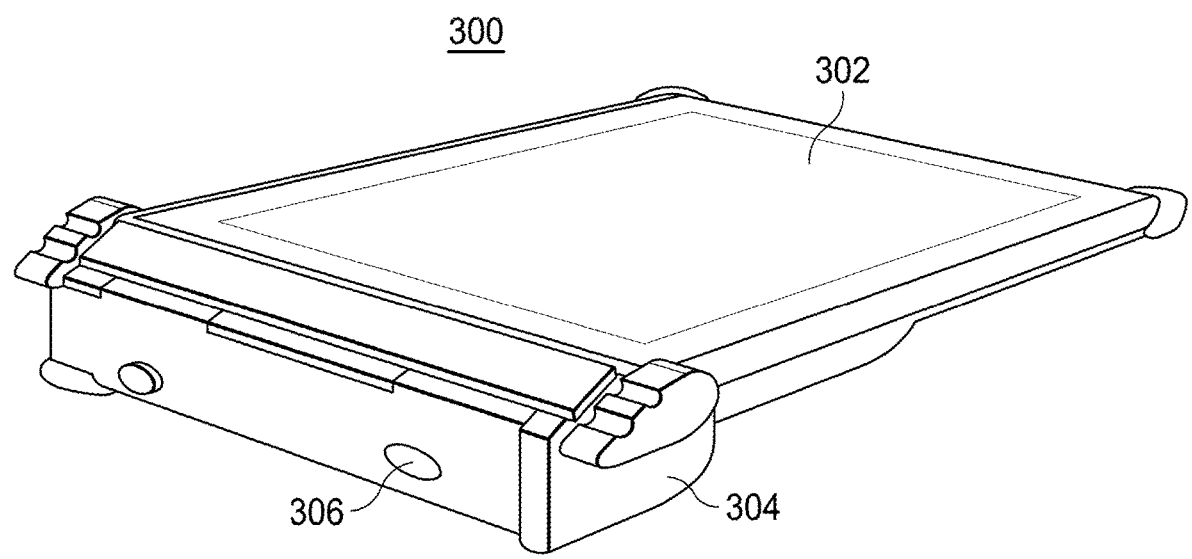
FIG. 3 is an illustration of an illustrative mobile computer with a handgrip portion having a releasable scan engine module disposed thereon.

With regard to FIG. 3, an illustration of a mobile computer system 300 including a mobile computer 302, such as a tablet, and a handgrip portion 304 with a releasable scan engine module 306 is shown. In operation, an operator may use the mobile computer system 300 to scan machine-readable indicia using the releasable scan engine module 306 positioned within the handgrip portion 304 in a retained state or in a released state, such as shown in FIG. 2. In the retained state, the operator aims the releasable scan engine module 306 at a machine-readable indicia by moving the entire mobile computer system 300. The scan engine module 306 may be triggered to perform the scan by an operator pressing a physical button (see FIGS. 7A, 7C, 7D) on the module 306. Alternatively, a hard-button (not shown) may be additionally and/or alternatively available on the handgrip portion 304. Still yet, a soft-button available on a user interface of a touch sensitive screen of the mobile computer 302 may be used in addition to or alternative to a hard-button on the module 306 and/or hand grip 304.

Figure 4:
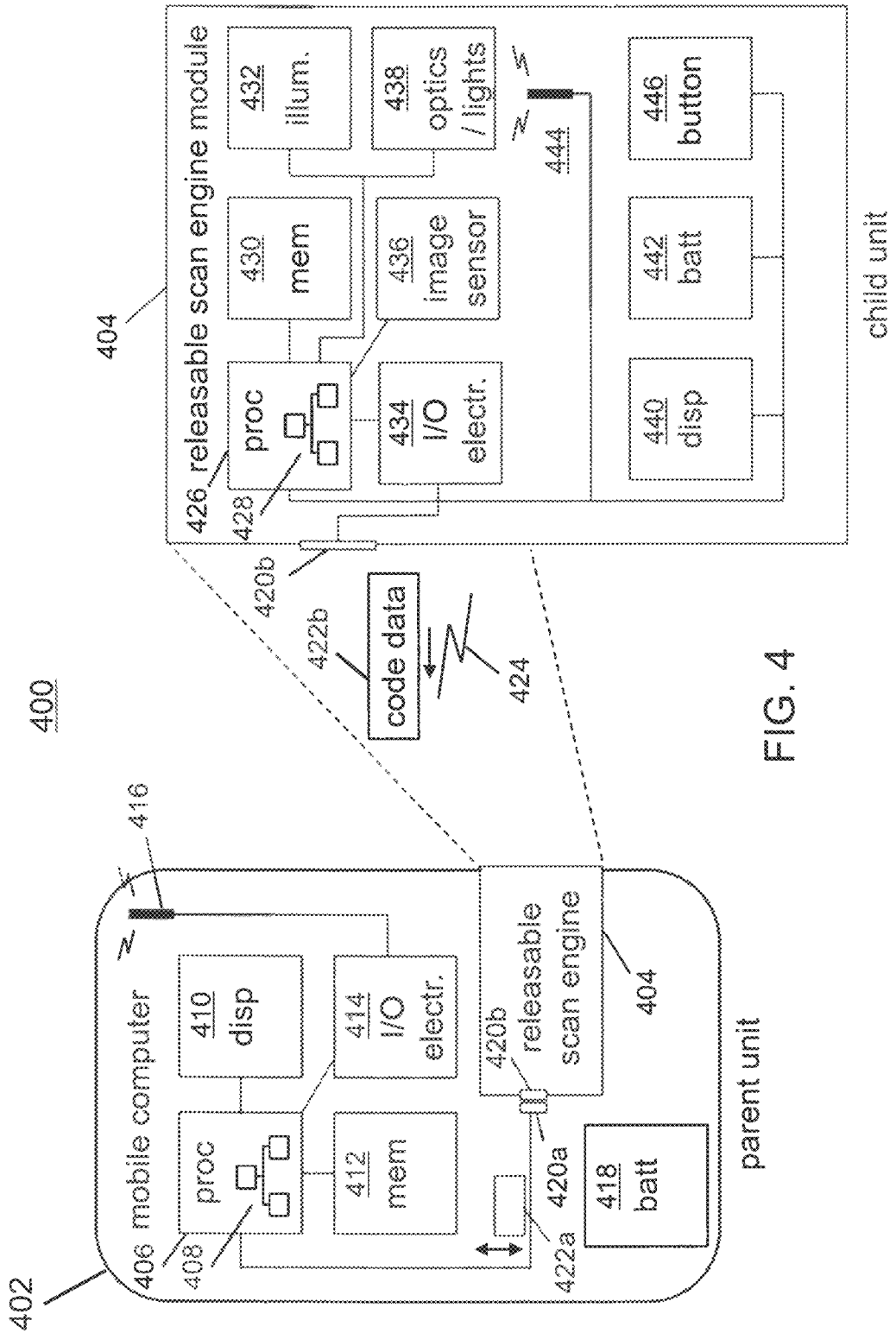
FIG. 4 is a block diagram of an illustrative mobile computing system including a mobile computer with a releasable scan engine module that may operate autonomously when separated from the mobile computer.

With regard to FIG. 4, a block diagram of a mobile computing system 400 including a mobile computer 402 with a releasable scan engine module 404 that may operate autonomously from the mobile computer 402 is shown. The mobile computer 402 is shown to include a processor 406 that executes software 408. The processor 406 may be in communication with an electronic display 410 that is used to display information, such as decoded data of a machine-readable indicia. The processor 406 may be in communication with a non-transitory memory 412 that may be used to store data and software, as understood in the art. Input/output (I/O) electronics 414 may be in communication with the processor 406, and be configured to format and communicate data to an antenna 416 for wireless communication of the data via a wireless communications channel using any wireless communications protocol as understood in the art. A battery 418 may be a rechargeable battery, and be used to power each of the electronic devices operating on the mobile computer 402, as understood in the art. The mobile computer 402 may also have a wired power supply sub-system.

The releasable scan engine 404 may be physically and electrically connected to the mobile computer via electrical connectors 420a and 420b (collectively 420) adapted to connect with one another. The electrical connections 420 may utilize any connector configuration, either standard or proprietary. The releasable scan engine module 404 may be releasably connected to the mobile computer 402 through use of quick disconnect hardware (see for example, FIG. 7E) that enables the user to easily connect and release the releasable scan engine module to and from the mobile computer 402, as further described herein.

The releasable scan engine module 404 is shown to communicate data 422a to the processor 406 in the engaged state (i.e., when releasably physically and electrically connected) with the mobile computer 402, and to communicate data 422b via a bi-directional wireless communications channel 424 when the releasable scan engine module 404 is in a released state (i.e., when not releasably physically and electrically connected to the mobile computer 402).

The releasable scan engine module 404 may include a processor 426 that executes software 428 so as to perform the functionality of the scan engine module 404 as further provided herein. The processor 426 may be in communication with a non-transitory memory 430 and configured to store data and software. An illumination device 432 may include a bright light to illuminate a machine-readable indicia. The processor 426 may further be in communication with I/O electronics 434 configured to communicate data over the wireless communications channel 424 and with the mobile computer 402 via electrical connectors 420b and 420a. An image sensor 436 may be configured to receive illumination signals when an operator is using the releasable scan engine module 404 in either the retained or released state to capture images of machine-readable indicia. The image sensor 436 may be configured to capture images and/or light pulses, if using a laser scanner. The illuminator 432 may further or alternatively be configured with a laser to perform laser scanning, as understood in the art.

The scan engine module 404 may further be configured with optics that are used to illuminate light an image scene onto the image sensor 436. In an embodiment, optics and lights, such as an aiming light or light guides to help a user to better aim the releasable scan engine module 404 in scanning a machine-readable indicia, may be provided. In an embodiment, the optics 438 may include an illuminator that produces a light indicator that may be turned on to indicate whether the module 404 correctly or incorrectly decodes a machine-readable indicia. The optics may include optics for light beams that exit the module 404 and that enter the module to be incident on the image sensor 436.

An electronic display 440 may be configured to display data for an operator to view and/or establish settings for the releasable scan engine module 404. The module 404 may further include a battery 442, such as a rechargeable battery, that is used to power electric devices on the module 404. To charge the rechargeable battery 442, power from the mobile computer 402 may be delivered to the module 404.

The module 404 may further be configured with an accelerometer or angle switch, for example, that turns on the scan engine module 404 when rotated by 90 degrees, for example, to replicate starting a car. Still yet, a microphone may be included with the module 404 to enable an operator to provide voice commands that the processor of the module may identify and follow. The module 404 may further be configured to provide haptic feedback (e.g., vibrator) and/or visual feedback (e.g. LED(s)) to assist the user to perform scanning operations. Still yet, the module 404 may include a speaker to provide audible output and/or small electronic display, possible textual.

The decoded data may be communicated via the wireless communications channel 424 by the processor 426 via the I/O electronics 434 and antenna 444. A hard-button 446 may be provided for the operator to press to cause the image sensor 436 to capture an image of the machine-readable indicia. In an embodiment, in response to the user pressing the button 446, a signal may be communicated to the processor 426, which may trigger the image sensor 436 to capture an image, and further causing the processor to decode image data and to generate decoded data representative of information encoded in the machine-readable indicia. The illuminator 432 and/or optics/lights 438 may additionally be activated in response to the hard-button 446 being pressed or otherwise activated. As further described herein, the processor may be configured by the software 428 to either communicate the decoded data back to the mobile computer 402 or store of the decoded data in the memory 430 in a batch mode until the releasable scan engine module 404 is placed back into an engaged state (i.e., reconnected) with the mobile computer 402. As an alternative to the hard-button 446, alternative scan triggers may be provided, such as a touch soft-button, gestures sensed by one or more accelerometers (not shown), microphone (not shown) used to receive vocal commands along with a processor (or the processor 426) that transcribes the voice commands to text for processing, and/or other trigger mechanism.

In an embodiment, the module 404 may capture and send captured images. The mobile computer 402 may be configured to update software and/or firmware of the module 404. The data communications may range from a few KB to several MBs of data. In the event that engine module is not able to correctly decode the machine-readable indicia, the module 404 may save the image, and then send, to the mobile computer 402, the scanned image either wirelessly or when physically connected or docked to the mobile computer 402. The scanned image may be analyzed further by the processor 406 of the mobile computer 402, thereby taking advantage of potentially more powerful computing resources of the processor 406 of the mobile computer 402 over the processor 426 of the releasable scan engine module 404. In an embodiment, the scanned image may be analyzed further by remote cloud services, such as in the case that the mobile computer 402 may remotely connect to cloud services. If, for example, a certainty of decoding parameter is below a certain value (e.g., below 90%), the processor 426 may communicate captured image data of the machine-readable indicia to receive a confirmation of the decoded data either real-time or non-real-time.

Figure 5:
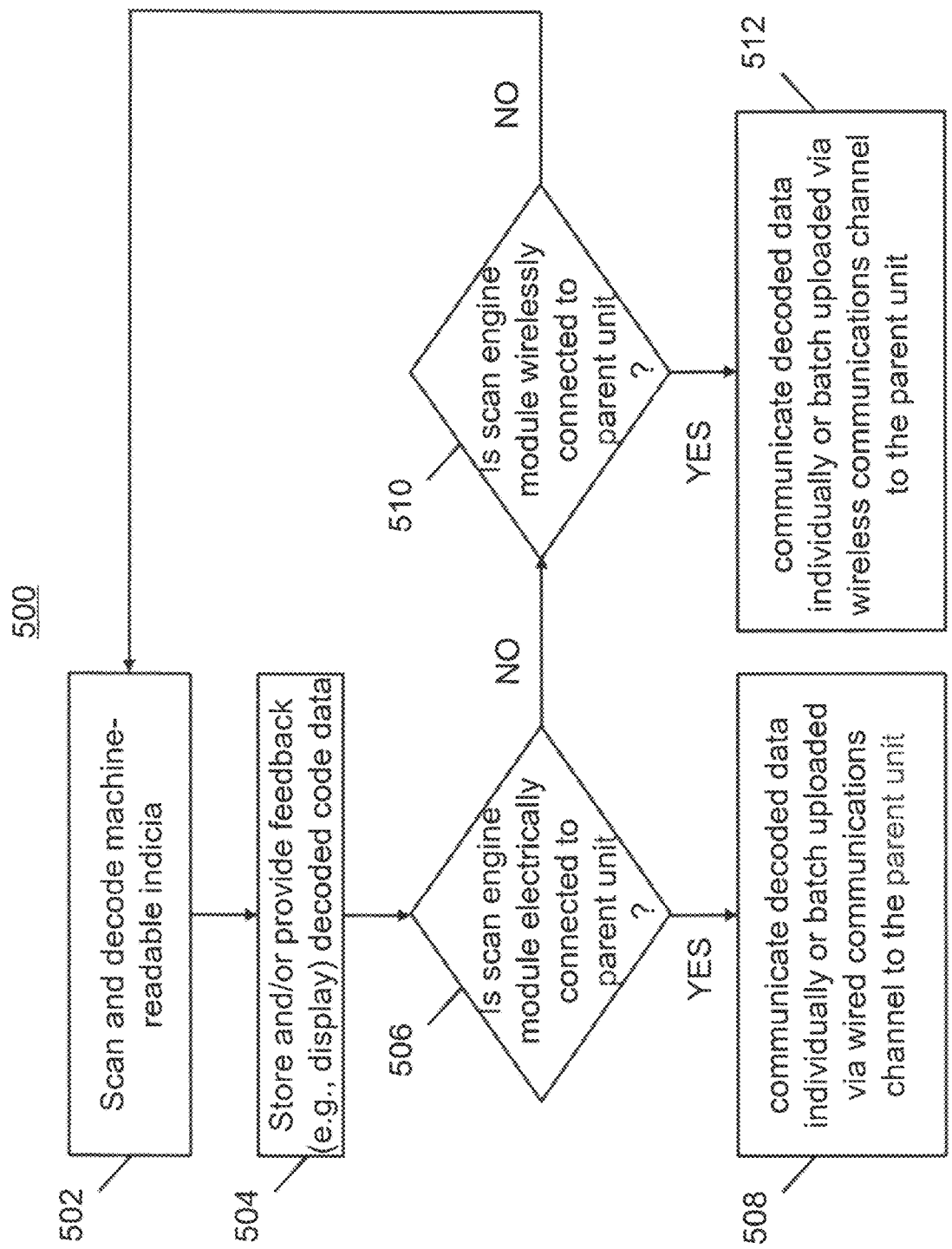
FIG. 5 is a flow diagram of an illustrative process for a releasable scan engine module to operate in conjunction with a mobile computer.

With regard to FIG. 5, a flow diagram of an illustrative process for a releasable scan engine module to operate in conjunction with a mobile computer is shown. The process 500 may start at step 502, where a machine-readable indicia may be scanned and decoded by the releasable scan engine module. At step 504, the decoded machine-readable indicia may be stored and/or provide user feedback (e.g., display decoded data on an electronic display device) by the scan engine module. In an alternative and/or additional embodiment, the scan engine module may be configured to generate an illumination signal (e.g., output a green light onto the machine-readable indicia), generate an audio signal (e.g., high pitch beep), and/or generate a haptic signal (e.g., vibration) in the event of successfully decoding a machine-readable indicia. Alternative signals may be generated in the event of failing to successfully decoding a machine-readable indicia to notify the user that the scan/decode failed so as to rescan the machine-readable indicia. Each of these options may be performed at step 504 or another step while the scan engine module is operating autonomously, as described herein. At step 506, a determination may be made as to whether the scan engine module is electrically connected to a parent unit or mobile computer. If so, then the process 500 may continue at step 508, where the decoded data may be individually or batch uploaded via a wired communications channel.

If, at step 506, the determination is that the scan engine module is not electrically connected to the parent unit, then a determination at step 510 may be made as to whether the scan engine module is wirelessly connected to the parent unit. If so, then at step 512, the decoded data may be individually or batch uploaded via a wireless communications channel to the parent unit. If, at step 510, it is determined that the releasable scan engine module is not wirelessly connected to the parent unit, then the process may return to step 502 to enable the releasable scan engine module to continue being used to scan machine-readable indicia, and upload the decoded data of the machine-readable indicia to the parent unit depending on the connection and communication states as provided in steps 506 and 510.

In an embodiment, if the scan engine module is unused for a certain period of time, the scan engine module can also sleep automatically. In an embodiment, an number of trigger actions may wake up the scan engine module, which may also cause the scan engine module to pair with the mobile computer, if still available. Otherwise, if the scan engine module does not pair up with a local mobile computer, the scan engine module may operate in batch mode. The scan engine module may also wake up when attached to mobile computer, which may trigger the pairing procedure to enable the scan engine module to perform a batch download, for example, or otherwise be available for a user to use in scanning machine-readable indicia. In an embodiment, the mobile computer and/or releasable scan engine module may be configure with "find my parent"/"find my child" functions.

Figure 6:
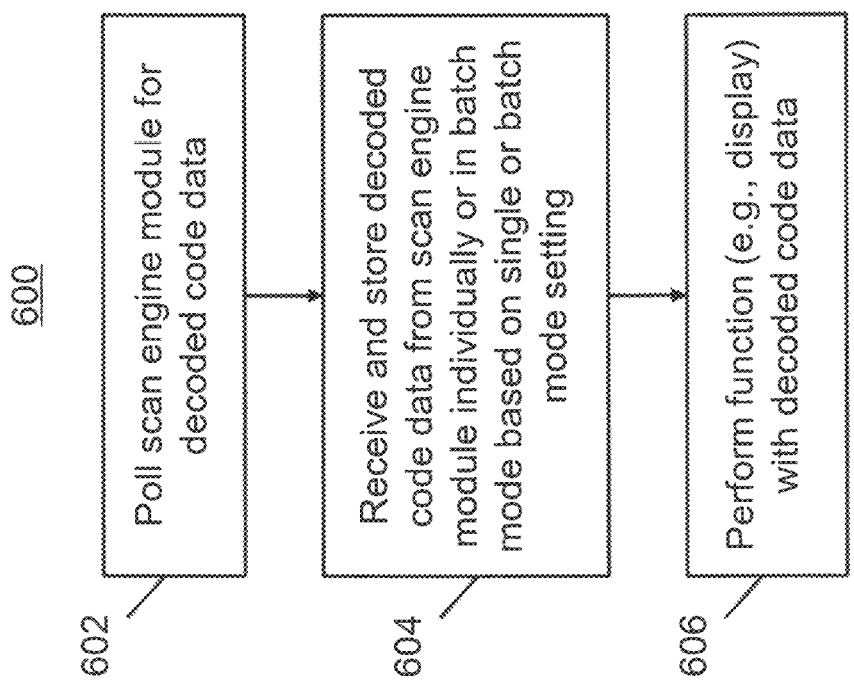
FIG. 6 is a flow diagram of an illustrative process for a mobile computer and releasable scan engine module to communicate decoded data derived from machine-readable indicia.

With regard to FIG. 6, a flow diagram of an illustrative process 600 for a mobile computer and releasable scan engine module to communicate decoded data from machine-readable indicia is shown. At step 602, a scan engine module may be polled for decoded code data. In an alternative embodiment, the mobile computer may receive a request from the releasable scan engine module to initiate uploading decoded machine-readable indicia. At step 604, the mobile computer may receive and store decoded code data from the scan engine module individually or in batch mode based on a single or batch mode setting or state. The single or batch mode setting may be established on the mobile computer and/or the releasable scan engine module. In an embodiment, the setting may be set automatically depending on the connection and communication states, as previously described. At step 606, a function (e.g., display on a user interface) may be performed with the decoded data by the mobile computer and/or releasable scan engine module.

With regard to FIGS. 7A-7E, illustrations of an illustrative mobile computing system 700 including a mobile device or computer 702 having a releasable scan engine module 704 releasably attached thereto via a holder 706 that is electrically and mechanically attached to the mobile computer 702 or handgrip 707 with an enclosure 708 to retain the mobile computer 702 are shown. The scan engine module 704 is shown to include a window 709 via which a scan (e.g., image or laser scan) may be performed, and a hard-button 710 that operates as a trigger to cause the scan engine module 704 to perform a scan of a machine-readable indicia. The holder 706 may be attached to the mobile computer 702 via a mount adapter 712 that is attached to the enclosure 708. In an alternative embodiment, the mount adapter 712 may be connected directly to the mobile computer 702. The holder 706 may include a mount tab 714 that may be aligned with the mount adapter 712 such that a connector member 716 (e.g., a screw) may connect or secure the mount tab 714 to the mount adapter 712, thereby retaining the holder 706 to the enclosure 708. In an alternative embodiment, the mount adapter 712 may be positioned directly on the mobile computer 702.

Release buttons 718*a* and 718*b* (collectively 718) may be configured to provide a quick attach/detach (quick connect/release) of the scan engine module 704 from the holder 706. In operation, a user may press or slide one or both of the release buttons 718, thereby enabling the scan engine module 704 to be released from the holder 706. The use of two release buttons 718 may help to reduce the chance of the releasable scan engine module 704 from inadvertently detaching from the holder 706, but one or more than two release buttons or other mechanisms may alternatively be utilized.

In an alternative embodiment, magnets may be used to releasably engage and disengage the scan engine module 704 with the mobile computer 702, holder 706 with the mobile computer 702, and/or module 704 with the holder 706. In an embodiment, a mechanical slider may be used to securely fasten the module 706 with the mobile computer 702 and/or holder 706.

Figure 7B:
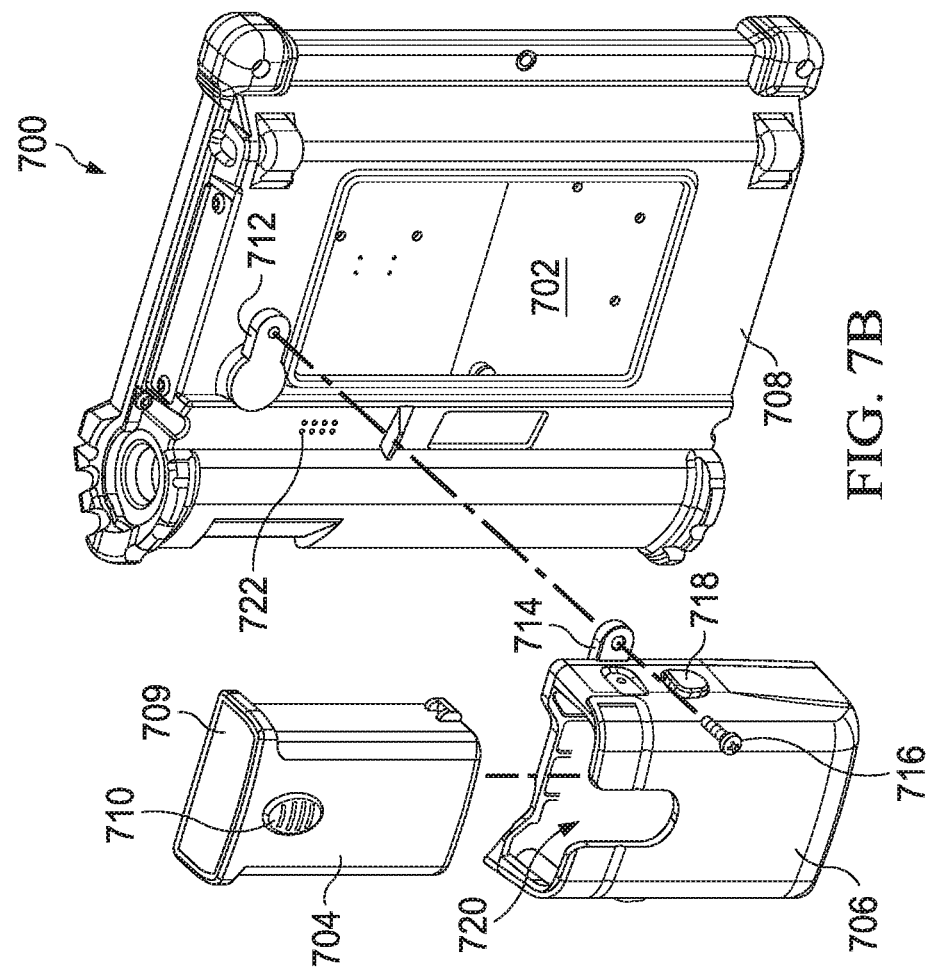
FIGS. 7A-7E are illustrations of an illustrative mobile computing system having a releasable scan engine module releasably attached thereto via a holder that is electrically and mechanically attached to the mobile computer or handgrip with an enclosure to retain the mobile computer.
Figure 7A:
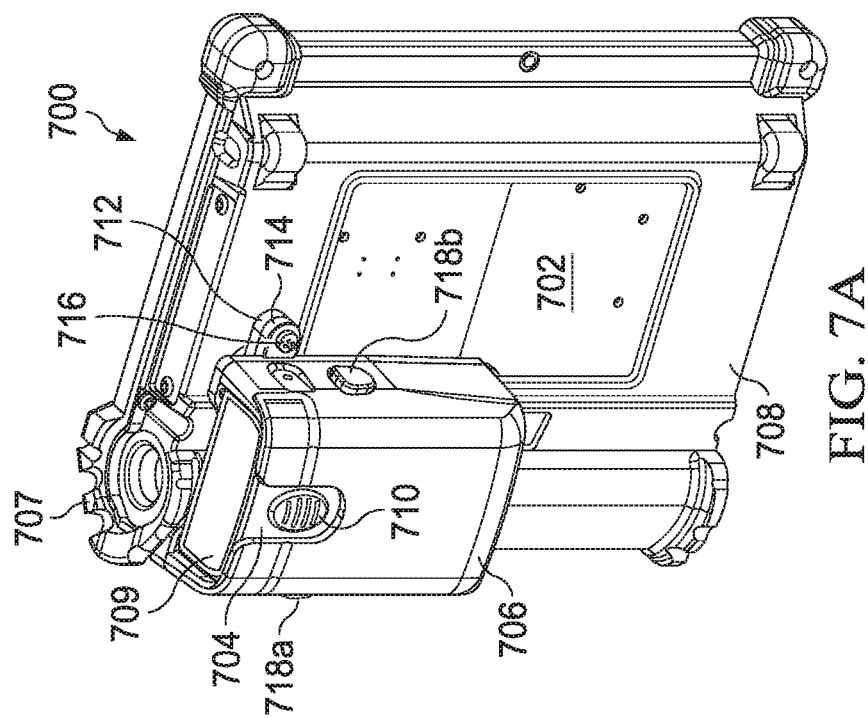

As shown in FIG. 7B, a cavity 720 within the holder 706 is configured to enable the scan engine module 704 to be positioned therein so as to be in an attached or retained state and released so as to be in a detached or released state. Because the scan engine module 704 is not fixably attached to the mobile computer 702, but rather releasably attached via the holder 706, the operator may more easily perform his or her duties in performing read operations of machine-readable indicia. In the attached state, the operator may scan machine-readable indicia while the scan engine module 704 is positioned within the holder 706, and in the released state, the operator may scan machine-readable indicia with the scan engine module 704 in an autonomous mode (i.e., independent of the mobile computer 702), as further described herein. An electrical connector 722 with electrical contacts may be positioned on the mobile computer 702 and/or enclosure 708, and the holder 706 may have a reciprocal electrical connector with reciprocal electrical contacts (not shown) to enable the module 704 to receive power and communicate data and/or command signals between the module 704 and mobile computer 702. Rather than using electrical contacts, the electrical connector may include sockets, pins, or other connector configuration.

Figure 7C:
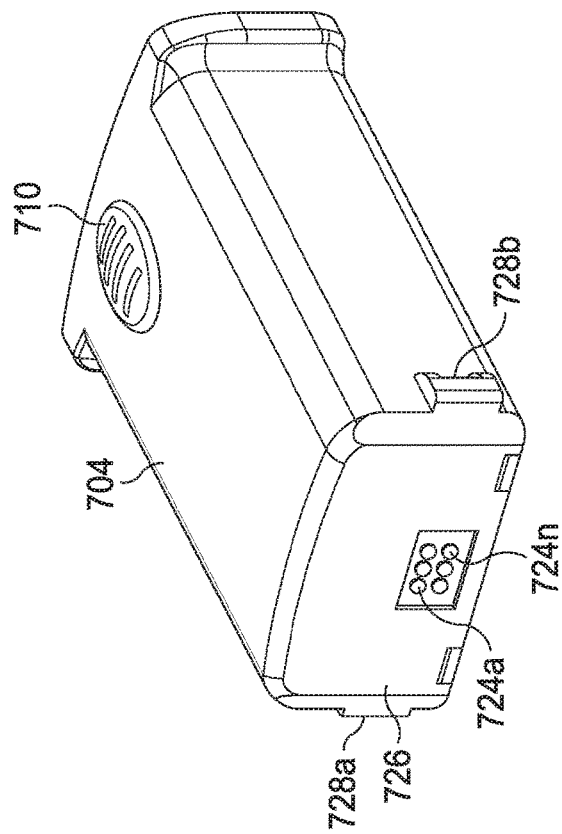

With regard to FIG. 7C, the releasable scan engine module 704 is shown to include electrical contacts 724*a*-724*n* (collectively 724) to define a connector that may be attached to a bottom wall 726 of a housing of the module 704. Catches 728*a* and 728*b* (collectively 728) may also be formed as part of the housing of the scan engine module 704 to enable quick connect and release functionality of the scan engine module 704 with the holder 706.

Figure 7D:
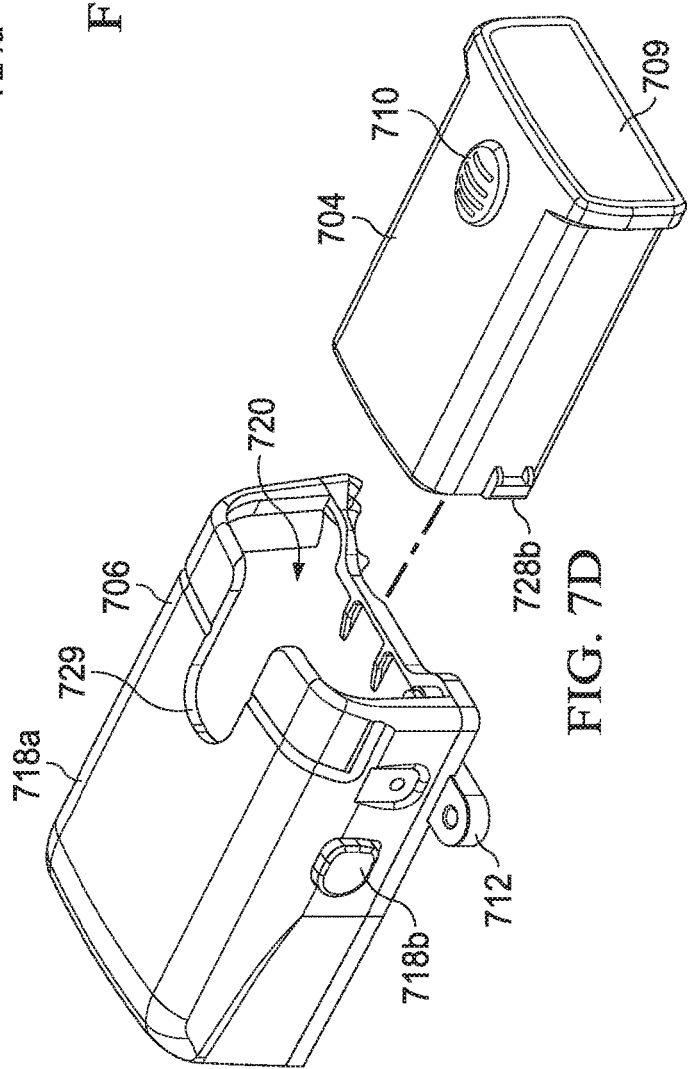

As shown in FIG. 7D, the scan engine module 704 may be aligned with the cavity 720 of the holder 706, and inserted therein such that the hard-button 710 may be aligned with and extend into a channel 729 defined by the holder 706. The channel 729 enables a user to have access to the hard-button 710 so as to trigger the scan engine module 704 to perform a scan of machine-readable indicia when in the attached state. It should be understood that alternative configurations of the holder 706 with respect to the scan engine module 704 may be provided in accordance with the principles described herein.

Figure 7E:
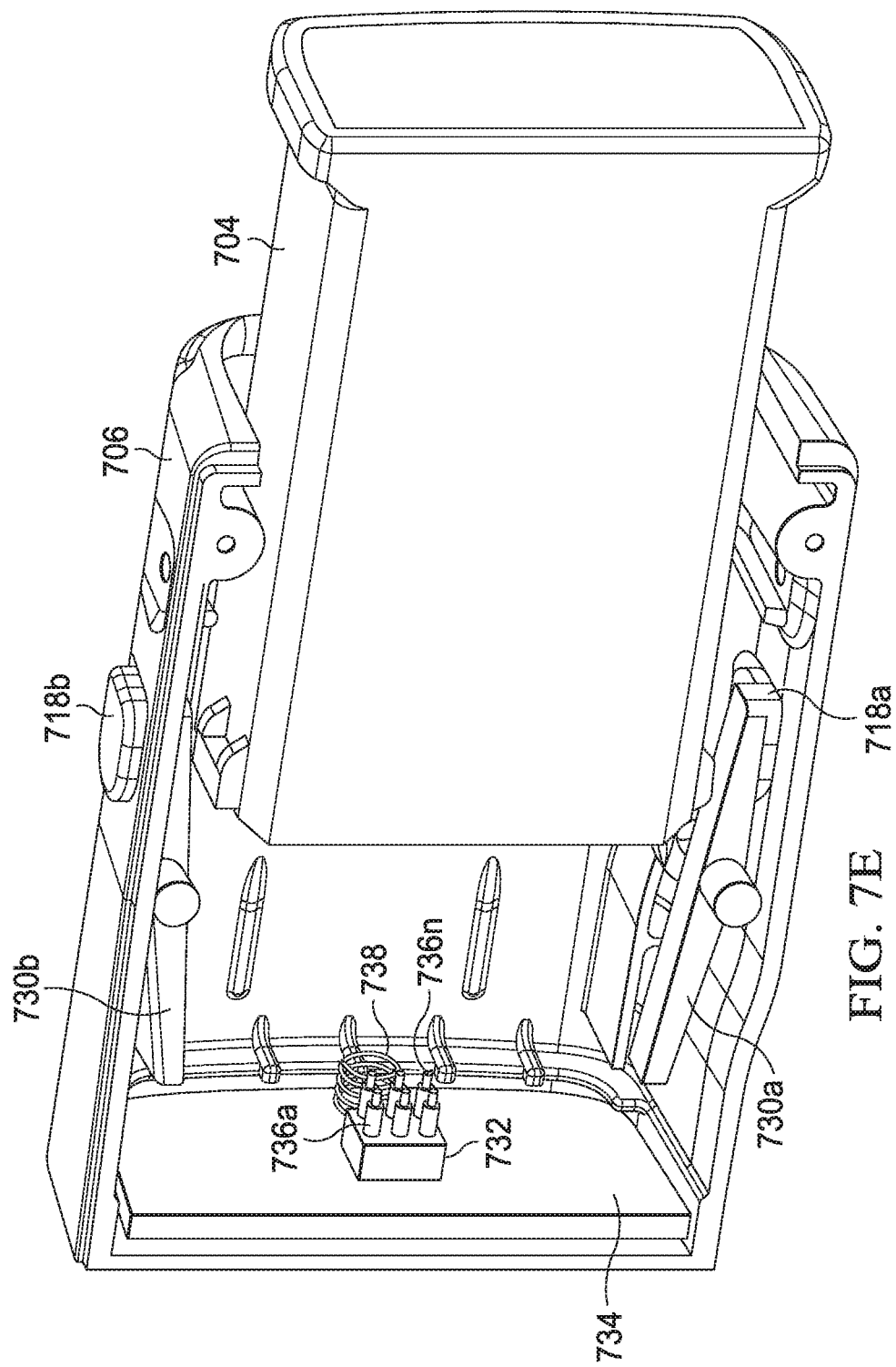

With regard to FIG. 7E, the holder 706 is shown to include the release buttons 718 connected to or engaged with levers 730*a* and 730*b* (collectively 730). The levers 730 may retain the releasable scan engine module 704 in the holder 706 and release the scan engine module 704 in response to a user pressing the release buttons 718. In operation, the levers 730 engage with the catches 728 when the module 704 is in the connected state, and separate from the catches 728 to enable the module 704 to slide past the levers 730 and out of the cavity 720 so as to be in the released state. A connector block 732 may be attached to and extend through a bottom surface 734 of the holder 706 so as to enable electrical conductors 736*a*-736*n* (collectively 736), such as pogo pins, that enable electrical signals to extend through the bottom surface 734. As shown in FIG. 7C, the electrical conductors 736 are the opposite ends of the electrical conductors 724. It should be understood that a wide variety of connectors may be utilized to enable electrical signals to be electrically communicated between the scan engine module 704 and the mobile computer 702 via the holder 706. To help the user in releasing and connecting the releasable scan engine module 704 from and to the holder 706, a spring 738 may be directly or indirectly in contact with the bottom surface 734 so that the module 704 is pressed against the levers 730 when in the connected state, and pushed toward the opening of the cavity 720 through which the module 704 was inserted when the levers 730 are transitioned to enable the module 704 to be released from the holder 706. It should be understood that the configuration of FIGS. 7A-7E are illustrative and that other quick connect and disconnect configurations may be utilized. Because the holder 706 includes hardware to retain the module 704 in a connected state and release the module to be in a released state without a tool (e.g., screwdriver), the scan engine module 704 is considered to be releasable.

In summary, the module 704 may be lightweight (e.g., a few ounces), ergonomic (e.g., easily and comfortably fits within a human hand), and optionally wearable. In terms of being wearable, a strap or other fastener to support the module 704 on a human body or clothing may be utilized. In an embodiment, a holder (not shown) configured to be worn on a human body or clothing that is also configured to releasably engage the module 704 may be utilized. In an embodiment, the module 704 may be configured with a lanyard, ring-like feature to enable wearing, and/or have a flat or shaped metallic surface to match some magnetic wearable companion, such as a bracelet. The module 704 may be physically robust to avoid damage in the event of being dropped.

Figure 8B:
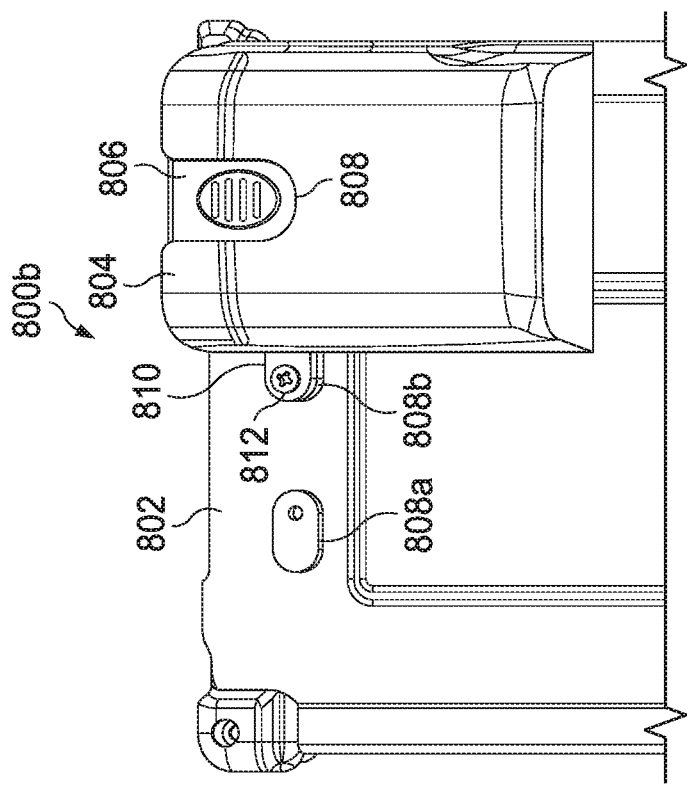
FIGS. 8A and 8B are illustrations of respective illustrative mobile computer having a carry case that provides support to enable a holder of a releasable scan engine module to be mechanically and electrically releasable engaged therewith.
Figure 8A:
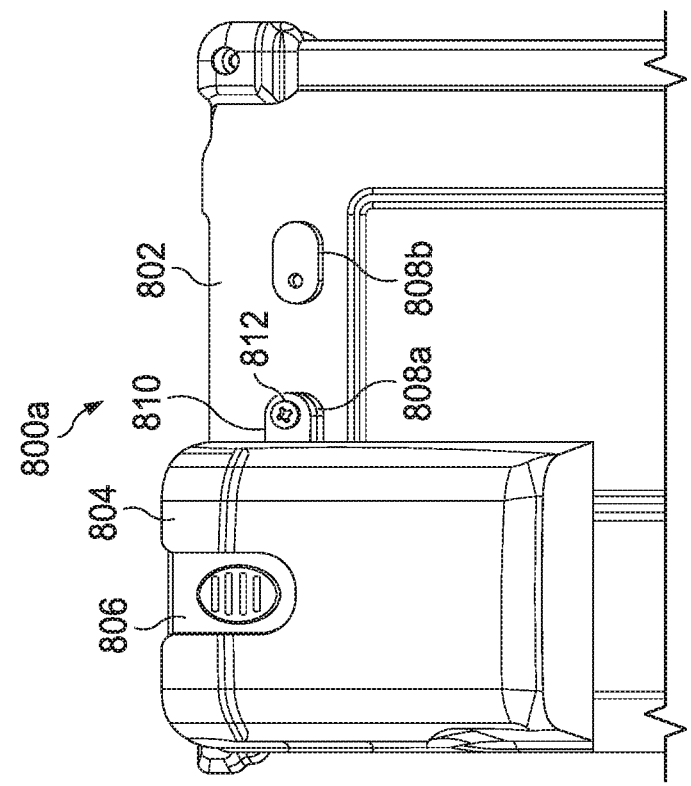

With regard to FIGS. 8A and 8B, illustrations of illustrative mobile computing systems 800*a* and 800*b* having a carry case or enclosure 802 that provides support to enable a holder 804 of a releasable scan engine module 806 to be mechanically and electrically releasably engaged therewith are shown. The carry case 802 may be configured with one or more adapter mounts 808a and 808b such that a user may connect the holder 804 on either a left holder mount 808a or right holder mount 808b. The holder 804 may have a right tab mount 810a or left tab mount 810b to enable a user to be able to mount the holder 804 to the left or right side of the carry case 802. A connection member 812, such as a screw, may be used to connect the mounts 808a and 810a or 808b and 810b together. It should be understood that the holder 804 and carry case 802 may have any number of alternative configurations.

The releasable scan engine module may be configured to be shared among different and possibly heterogeneous mobile computers that are configured to physically and communicatively support the releasable scan engine module. For example, if a user uses the releasable scan engine module with a first mobile computer and then transitions to a second mobile computer (e.g., vehicle-mounted mobile computer), then the same releasable scan engine module may be used with both mobile computers.

Figure 9:
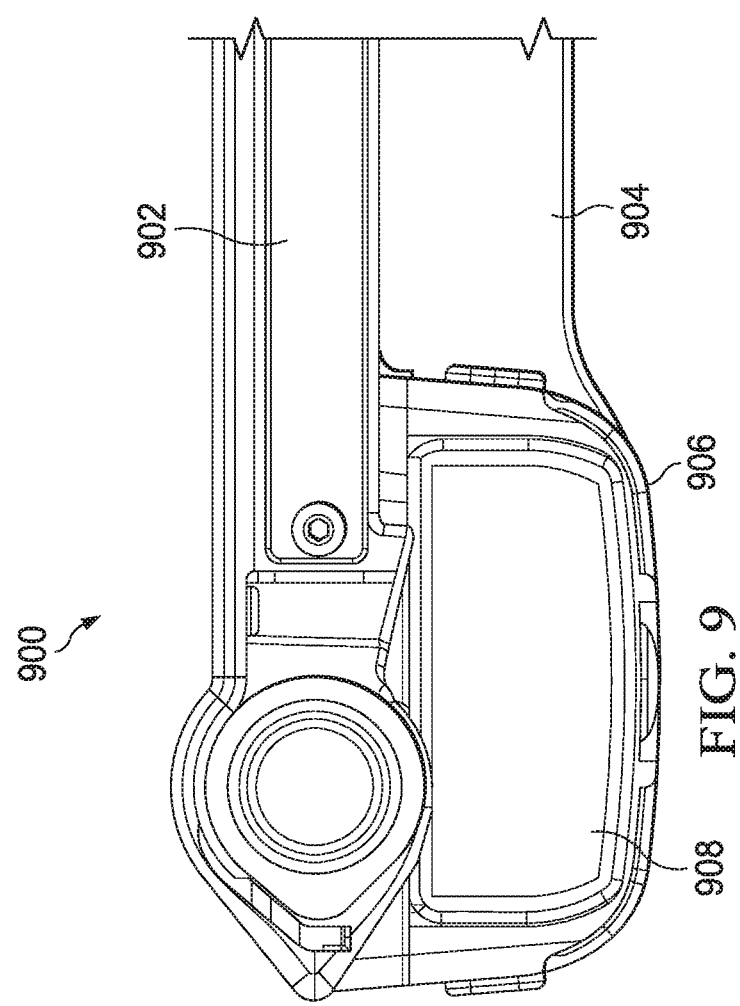
FIG. 9 is an illustration of an illustrative mobile computer having a case that defines a cavity within which a releasable scan engine module may be releasably engaged.

With regard to FIG. 9, an illustration of an illustrative mobile computing system 900 having a mobile computer 902 supported by a case 904 that defines a cavity 906 within which a releasable scan engine module 908 may be releasably engaged is shown. In this configuration, the module 908 is directly retained to the case 904 rather than being indirectly retained via a holder, as previously described. It should be understood that a housing of a mobile computer may have a cavity in a housing such that a releasable scan engine module may be retained directly thereto rather than being retained to a case.

With regard to FIG. 10, a flow diagram of an illustrative process 1000 of a mobile computer and releasable scan engine module to communicate with one another in accordance with the principles provided herein is shown. The process 1000 may start at step 1002, where a mobile electronic device may be configured to automatically identify a releasable scan engine module (i.e., a mobile modular decoding system). In configuring the mobile electronic device to automatically identify a releasable scan engine module or mobile modular decoding system, a software program may be configured with settings that enables the mobile computer to automatically identify and link with the mobile modular decoding system such that a user does not need to perform a manual link function. Because each releasable scan engine module may be capable of interacting with multiple different mobile computers or parent units, a common or standard configuration protocol may be established for the parent units and releasable scan engine modules or child units.

At step 1004, a determination may be made as to whether a new electrical connection of the scan engine module is identified. The new electrical connection may be identified when the releasable scan engine module is directly or indirectly physically and electrically releasably connected to the mobile computer. In the releasable scan engine module being physically and electrically releasably connected to the mobile computer, electrical conductors may be used to enable electrical signals to be communicated between the processors of the releasable scan engine module and mobile computer. In an embodiment, the electrical conductors may extend from the processor of the mobile computer to a connector on the housing of the mobile computer, while electrical conductors may also extend from the processor of the releasable scan engine module to a connector on the housing thereof. When the respective electrical conductors are either directly or indirectly in electrical contact with one another, the determination at step 1004 is YES.

At step 1006, decoded machine-readable indicia data may be polled and/or received in either single or batch communications. In an embodiment, the mobile computer may poll the releasable scan engine module in response to detecting that the releasable scan engine module is either directly or indirectly electrically connected to the mobile computer at step 1004. The detection may include determining a model of the module (e.g., 1D, 2D, etc.). The decoded data may be uploaded from the releasable scan engine module in a single mode (i.e., one at a time) or batch mode (i.e., multiple at a time) depending on a setting of either or both the mobile computer and the releasable scan engine module.

At step 1008, a determination may be made as to whether the releasable scan engine module is in a scan data mode. If so, then the releasable scan engine module may be triggered by the user to capture and decode images of machine-readable indicia repeatedly while connected to the mobile computer at steps 1006 and 1008. Otherwise, if the releasable scan engine module is not determined to be in the scan data mode at step 1008, then the process 1000 may return to step 1004 to wait until the releasable scan engine module releasably reconnects with the mobile computer after being released therefrom. It should be understood that the process provided in FIG. 10 is illustrative, and that many other processes may be utilized to perform the same or similar functions.

One embodiment of a method of scanning a machine-readable indicia may include, in response to determining that the scan engine module is in an engaged state and electrically connected to a computer, communicating the decoded data to the computer via a wired communications channel. Otherwise, in response to determining that the scan engine module is in a released state and wirelessly connected to the computer, communicate the decoded data to the computer via a wireless communications channel.

In response to determining that the scan engine module is in a released state and not wirelessly connected to the computer, the decoded data may be stored in a non-transitory memory. In response to the scan engine module being electrically connected to the mobile computer, the decoded data may be communicated to the mobile computer via the wired communications channel.

While the scan engine module is in a released state, the scan engine module may be enabled to scan at least one second machine-readable indicia, decode the second machine-readable indicia(s) to generate at least one second decoded data, and store the second decoded data in a non-transitory memory of the scan engine module. In response to the scan engine module being electrically connected to the mobile computer, the stored decoded data may be communicated or uploaded via the electrical communications channel. In an embodiment, the scan engine module automatically wirelessly synchronized with the mobile computer.

In an embodiment, the process may further include capturing an image of the machine-readable indicia in response to determining that the scan engine module failed to decode a machine-readable indicia. Alternatively, an image of the machine-readable indicia may be captured with every scan. The image of the machine-readable indicia may be communicated to the mobile computer for decoding thereby. Such a process may be used to take advantage of potentially higher computing power than available on the scan engine module.

One embodiment of a mobile computer system may include a mobile computer, and a releasable scan engine module configured to operate autonomously from the mobile computer in scanning and decoding machine-readable indicia. The mobile computer may be configured to automatically identify the releasable scan engine module via a wired communications channel and a wireless communications channel.

The releasable scan engine module may be configured to automatically communicate with the mobile computer in either a connected state or released state to enable the scan engine module to (i) scan a machine-readable indicia, (ii) decode the machine-readable indicia to generate decoded data represented by the machine-readable indicia, (iii) (a) determine if the releasable scan engine module is in communication with the mobile computer, and if so, communicate the decoded data to the mobile computer via the wired communications channel, (b) otherwise, determine if the releasable scan engine module is in communication with the mobile computer via the wireless communications channel, and if so, communicate the decoded data via the wireless communications channel to the mobile computer, (c) otherwise, determine if the releasable scan engine module is not in communication with the mobile computer via the wireless communications channel, and if so, store the decoded data into a non-transitory memory.

The mobile computer may further be configured with an electrical connector to which a reciprocal electrical connector on the releasable scan engine module is configured to physically and electrically connect, and in response to being physically and electrically connected, the releasable scan engine module being configured to upload a batch of decoded data representative of a plurality of machine-readable indicia decoded by the releasable scan engine module when in a released state.

The mobile computer may further be configured with an electrical connector disposed on a housing thereof, and a holder may be configured with an electrical connector that physically and electrically connects to the electrical connector of the mobile computer. The holder may be configured to enable the releasable scan engine module to indirectly electrically connect to the electrical connector of the mobile computer when the releasable scan engine is in an engaged state with the holder.

The mobile computer may further be configured to automatically identify a releasable scan engine with a setting having at least one parameter in a configuration file of the mobile computer such that the releasable scan engine module is automatically identified, thereby allowing the user to wirelessly use the releasable scan engine module without having to perform a manual registration of the releasable scan engine module and mobile computer.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed is:

1. A mobile computer system, comprising:
a mobile computer including:
 a first housing;
 a first electrical connector disposed on the first housing;
 a first processor in electrical communication with the first electrical connector;
 a first non-transitory memory in electrical communication with the first processor and configured to store data;
 a first antenna;
 first input/output (I/O) electronics in electrical communication with the first processor and the first antenna, and configured to communicate over respective communications channels via the first electrical connector and the first antenna; and
a releasable scan engine module including:
 a second housing;
 a second electrical connector adapted to form an electrical connection with the first electrical connector when the removable scan engine module is in an engaged state with the mobile computer;
 a second processor in electrical communication with the second electrical connector;
 a second non-transitory memory in electrical communication with the second processor and configured to store data;
 a second antenna;
 second I/O electronics in communication with the second processor, and configured to communicate data over respective communications channels via the second electrical connector and the second antenna; and
 an optical sensor configured to capture image signals representative of the machine-readable indicia, the second processor being configured to decode the captured image signals and to produce decoded data represented by the machine-readable indicia.

2. The mobile computer system according to claim 1, wherein the first and second processors are configured to communicate via the first and second electrical connectors when in physical and electrical contact with one another when the releasable scan engine module is in an attached state.

3. The mobile computer system according to claim 1, wherein the first and second processors are configured to automatically communicate via the first and second antennas when the releasable scan engine module is in a released state such that the first and second electrical connectors are physically and electrically separated from one another.

4. The mobile computer system according to claim 1, further comprising an illuminator configured to illuminate the machine-readable indicia to be read by the removable scan engine module.

5. The mobile computer system according to claim 1, wherein the removable scan engine module further includes a rechargeable battery that, when the first and second electrical connectors are connected to one another, is recharged by the mobile computer.

6. The mobile computer system according to claim 1, wherein the releasable scan engine module is configurable to operate in either a live mode or a batch scan mode when detached from the mobile computer.

7. The mobile computer system according to claim 1, wherein the releasable scan engine module, in being configured in a single scan mode, is configured to;
 scan the machine-readable indicia;
 decode the machine-readable indicia to generate decoded data represented by the machine-readable indicia; and
 automatically communicate the decoded data via the second antenna over a wireless communications channel to the first antenna for the first processor to store the decoded data in the first non-transitory memory.

8. The mobile computer system according to claim 1, wherein the first housing defines a cavity within which the releasable scan engine module is removably attachable, and to enable the first and second connectors to be in electrical contact with one another.

9. The mobile computer system according to claim 1, wherein in response to the first and second connectors being connected to one another, the first processor is configured to download multiple decoded data of machine-readable indicia that that was batch scanned by the releasable scan engine.

10. The mobile computer system according to claim 9, wherein the first processor is configured to poll the second processor to cause the first processor to download the multiple decoded data of machine-readable indicia.

11. The mobile computer system of claim 1, wherein the mobile computer is a vehicle mounted mobile computer.

12. The mobile computer system of claim 1, wherein the releasable scan engine is configured to transmit an image of the machine-readable indicia to the mobile computer.

13. The mobile computer system of claim 12, wherein the mobile computer is further configured to transmit the image to remote cloud services configured to perform further analysis on the image.

14. The mobile computer system of claim 12, wherein the image is transmitted from the releasable scan engine to the mobile computer responsive to an unsuccessful decoding by the releasable scan engine.

15. The mobile computer system of claim 12, wherein the mobile computer is configured to perform decoding of the machine-readable indicate from the image and transmit releasable scan engine is configured to transmit a confirmation of the decoding to the releasable scan engine.

16. The mobile computer system of claim 1, wherein the second housing of the releasable scan engine module is configured as a wearable device.

17. A mobile computer system comprising:
 a mobile computer; and
 a releasable scan engine module configured to operate autonomously from the mobile computer in scanning and decoding machine-readable indicia, the mobile computer being configured to automatically identify the releasable scan engine module via a wired communications channel and a wireless communications channel, wherein the releasable scan engine module is configured to automatically communicate with the mobile computer in either a connected state or released state to enable the scan engine module to:

scan a machine-readable indicia;
decode the machine-readable indicia to generate decoded data represented by the machine-readable indicia;
determine if the releasable scan engine module is in communication with the mobile computer, and if so, communicate the decoded data to the mobile computer via the wired communications channel,
otherwise, determine if the releasable scan engine module is in communication with the mobile computer via the wireless communications channel, and if so, communicate the decoded data via the wireless communications channel to the mobile computer,
otherwise, determine if the releasable scan engine module is not in communication with the mobile computer via the wireless communications channel, and if so, store the decoded data into a non-transitory memory.

18. A mobile computer system comprising:
a mobile computer; and
a releasable scan engine module configured to operate autonomously from the mobile computer in scanning and decoding machine-readable indicia, the mobile computer being configured to automatically identify the releasable scan engine module via a wired communications channel and a wireless communications channel, wherein the mobile computer is further configured with an electrical connector to which a reciprocal electrical connector on the releasable scan engine module is configured to physically and electrically connect, and in response to being physically and electrically connected, the releasable scan engine module being configured to upload a batch of decoded data representative of a plurality of machine-readable indicia decoded by the releasable scan engine module when in a released state.

19. A mobile computer system comprising:
a mobile computer including an electrical connector disposed on a housing thereof;
a releasable scan engine module configured to operate autonomously from the mobile computer in scanning and decoding machine-readable indicia, the mobile computer being configured to automatically identify the releasable scan engine module via a wired communications channel and a wireless communications channel; and
a holder configured with an electrical connector that physically and electrically connects to the electrical connector of the mobile computer, the holder being configured to enable the releasable scan engine module to indirectly electrically connect to the electrical connector of the mobile computer when the releasable scan engine is in an engaged state with the holder.

20. A mobile computer system comprising:
a mobile computer; and
a releasable scan engine module configured to operate autonomously from the mobile computer in scanning and decoding machine-readable indicia, the mobile computer being configured to automatically identify the releasable scan engine module via a wired communications channel and a wireless communications channel,
wherein the mobile computer is further configured to automatically identify the releasable scan engine with a setting having at least one parameter in a configuration file of the mobile computer such that the releasable scan engine module is automatically identified, thereby allowing the user to wirelessly use the releasable scan engine module without having to perform a manual registration of the releasable scan engine module and mobile computer.

* * * * *